(12) United States Patent
Head

(10) Patent No.: US 8,316,928 B2
(45) Date of Patent: Nov. 27, 2012

(54) DRIVE MEANS

(75) Inventor: Philip Head, Surrey (GB)

(73) Assignee: Artificial Lift Company Limited, Surrey (GB)

( * ) Notice: Subject to any disclaimer, the term of this patent is extended or adjusted under 35 U.S.C. 154(b) by 183 days.

(21) Appl. No.: 12/476,343

(22) Filed: Jun. 2, 2009

(65) Prior Publication Data
US 2009/0297255 A1    Dec. 3, 2009

(30) Foreign Application Priority Data
Jun. 2, 2008    (GB) .................................. 0809966.5

(51) Int. Cl.
*E21B 43/00* (2006.01)
*F16D 3/04* (2006.01)
(52) U.S. Cl. ........................ 166/68.5; 166/105; 464/102
(58) Field of Classification Search ................ 168/68.5, 168/105; 464/102–105; 166/68.5, 105, 241.3; 384/116; 415/901
See application file for complete search history.

(56) References Cited

U.S. PATENT DOCUMENTS

| | | | | |
|---|---|---|---|---|
| 1,892,217 A | * | 12/1932 | Moineau | 74/458 |
| 2,841,037 A | * | 7/1958 | Randall | 475/233 |
| 3,280,453 A | * | 10/1966 | Clark | 29/738 |
| 4,080,115 A | | 3/1978 | Sims et al. | |
| 4,599,056 A | * | 7/1986 | Crase | 418/48 |
| 5,139,400 A | * | 8/1992 | Ide | 418/48 |
| 5,501,580 A | * | 3/1996 | Barrus et al. | 417/410.3 |
| 5,820,504 A | * | 10/1998 | Geralde | 475/177 |

* cited by examiner

*Primary Examiner* — Cathleen Hutchins
(74) *Attorney, Agent, or Firm* — Fay Sharpe LLP

(57) ABSTRACT

A drive means for downhole use comprises an input shaft and an output shaft, the input shaft being coupled to a means of rotation, the input shaft and the output shaft being torsionally coupled, the output shaft being coupled to the rotor of the progressive cavity pump, the input shaft lies in a first axis and the output shaft lies in a second axis, the second axis being parallel to the first axis but spaced from it so that the output shaft rotates about its axis while describing a circular path.

12 Claims, 4 Drawing Sheets

DRIVE MEANS

This application claims priority to and the benefit of Great Britain patent application numbers GB0809966.5, filed Jun. 2, 2008, the entirety of which application is hereby incorporated by reference.

FIELD OF THE INVENTION

This invention relates to drive means, particularly drive means for progressive cavity pumps.

BACKGROUND OF THE INVENTION

A progressive cavity pump usually comprises a helical rotor disposed in a double helical bore. Sealed cavities exist between the surfaces of the rotor and stator, and as the rotor turns, these sealed cavities progress along the length of the pump. Thus fluid entering a forming cavity at one end of the pump is transported the length of the pump until the cavity reaches the other end of the pump. The rotor rotates about a central axis, however no part of the rotor lies on this axis, rather each part of the rotor is spaced from the central axis it orbits. Since a drive means usually generates a rotating output that is coincident with the axis of rotation, a jointed or flexible shaft is used to connect the drive output to the rotor.

OBJECTS OF THE INVENTION

Jointed or flexible shafts may suffer from wear. An object of the present invention is to provide an alternative means of driving the rotor.

SUMMARY OF THE INVENTION

According to the invention there is provided a drive means for downhole use, comprising an input shaft and an output shaft, the input shaft being coupled to a means of rotation, the input shaft and the output shaft being torsionally coupled, the output shaft being coupled to the rotor of the progressive cavity pump, wherein the input shaft lies in a first axis and the output shaft lies in a second axis, the second axis being parallel to the first axis but spaced from it so that the output shaft rotates about its axis while describing a circular path.

BRIEF DESCRIPTION OF THE DRAWINGS

The invention is described, by way of example and not intended to be limiting, by the following embodiments, of which

DESCRIPTION OF THE PREFERRED EMBODIMENT

Figure 1:
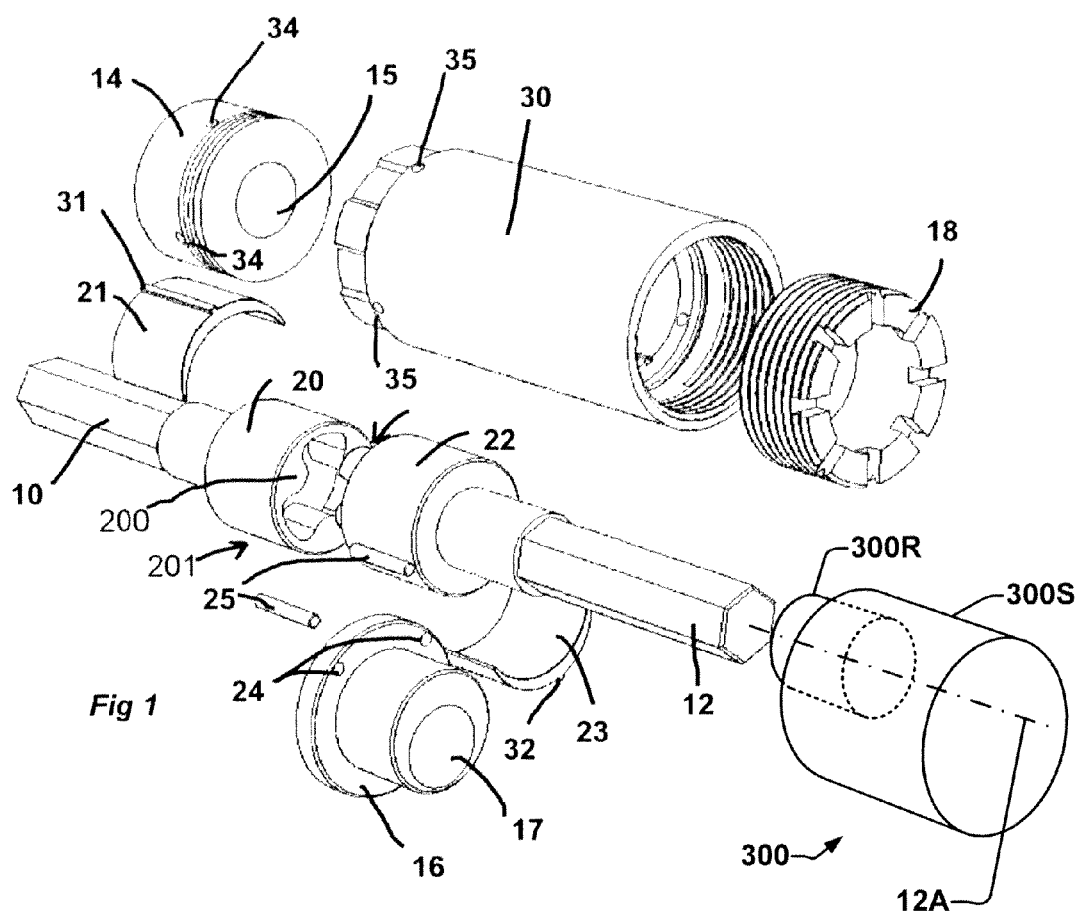
FIG. 1 is an exploded perspective view of the drive means with an output shaft of the drive means coupled to a rotor of a progressive cavity pump
Figure 2:
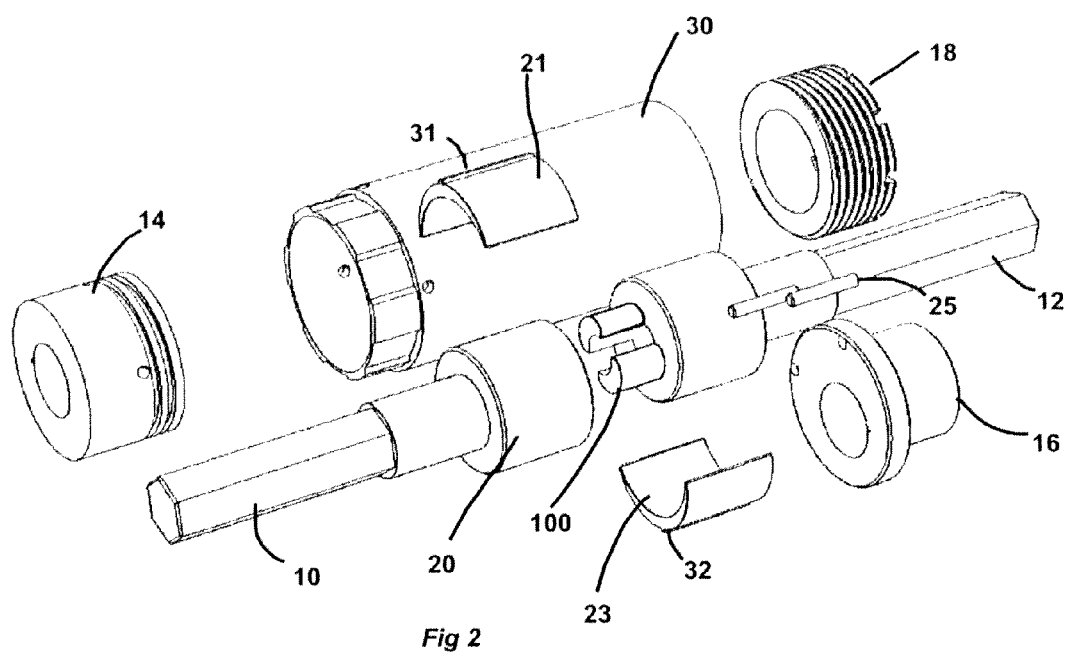
FIG. 2 is an exploded perspective view of the drive means viewed from another angle
Figure 3:
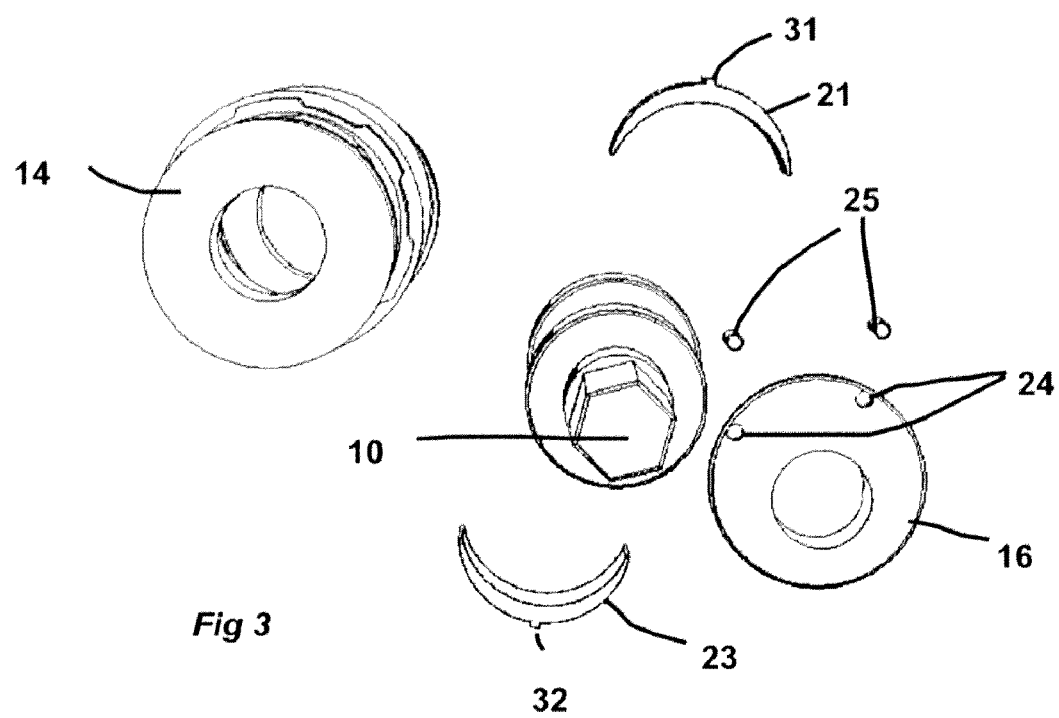
FIG. 3 is an exploded perspective view of the drive means viewed from another angle

Referring to FIGS. 1 and 2, the drive means comprises an input shaft 10 coupled to an output shaft 12, disposed in a housing 30. The input shaft 10 protrudes through the bore 15 of an input end cap 14 which is secured to the housing 30. Similarly, the output shaft 12 protrudes through the bore 17 of an output end cap 16 which is secured to the housing 30. A connector member 18 fits over the output end cap 16 and attaches to the housing 30 with a thread. The input shaft 10 and output shaft 12 are supporting inside the housing 30 by eccentric bearings 21, 23 respectively.

The input drive shaft 10 is coupled to some conventional drive means, that rotates the input drive shaft 10 about its central axis. The input drive shaft includes a head 20 having a female outer rotor 201 of a gerotor, ideally this is a three-lobed 200 shape. The input drive head 20 is supported on an eccentric element 21. The output drive has a corresponding output drive shaft head 22, which features a male inner rotor 101 of a gerotor, ideally having a two-lobed 100 shape, which engages with the female outer rotor of the input drive head 20. The output drive shaft head 22 is similarly supported on an eccentric bearing 23.

Figure 4:
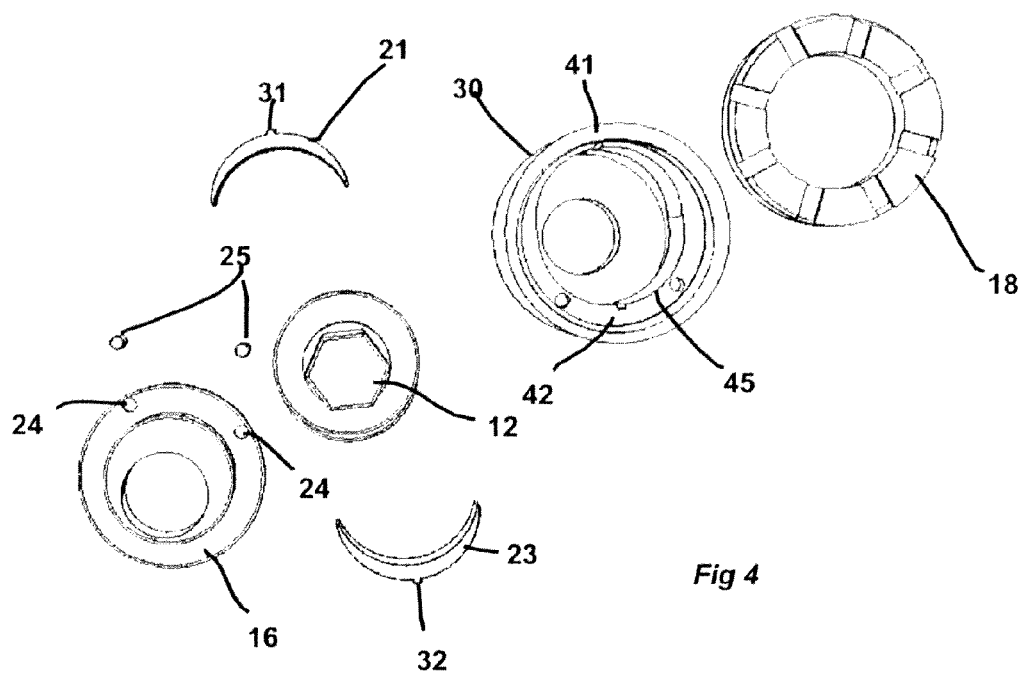
FIG. 4 is an exploded perspective view of the drive means viewed from another angle

Referring to FIG. 4, the housing 30 has a bore 45 which accommodates the input drive shaft head 20 and output drive shaft head 22. The bore has a two lobed section, in which the crescent-shaped eccentric bearings 21, 23 sit, the bearings facing each other when the bore is considered axially. Each bearing 21, 23 has a ridge 31, 32 which engages in slots 41, 42 on the inner surface of the bore 45 in order to locate them. The two-lobed shape of the bore 45 is offset from the central axis, so that the eccentric bearing 21 is radially displaced further than the eccentric bearing 23. When the input drive shaft head 20 is resting in the bore 45 against the eccentric bearing 21, the input drive shaft 10 is coincident with the center axis of the housing 30. The output drive shaft head 22 is disposed eccentrically, so that when it rests in the bore 45 against the eccentric bearing 23, the output drive shaft 12 is spaced from the center axis of the housing 30.

After the input and output drive shaft heads 20, 22 have been positioned in the housing 30 with their respective eccentric bearings 21, 23, so that the male inner rotor of the output drive shaft head 22 engages with the female outer rotor of the input drive shaft head 20, the input and output drive shafts 10 and 12 are secured together by input end cap 14 and output end cap 16 to the housing 30, with the input shaft 10 protruding through the central bore 15 of the input end cap 14, and the output shaft 12 protruding from the eccentric bore 17 of the output end cap 16. The input end cap can be secured for example by pins placed in corresponding holes 34, 35 in the input end cap and the housing. The output end cap is rotationally constrained to the housing pins 25 which pass through output end cap holes 24 and engage in corresponding holes in the housing. Connector member 18 is then fitted over the output end cap.

In use, the input shaft 10 is rotated about its central axis. As the input shaft head 20 rotates, the engagement of the female outer rotor causes the male inner rotor of the output shaft head 22, and therefore also the output shaft 12 itself, to also rotate. However, the male inner rotor is offset from the axis of rotation of the input shaft, always engaging the female outer rotor at a radially spaced position, the radial spacing being constrained by the eccentric bearing 23.

Although the radial spacing of the output shaft 12 is constrained by the eccentric bearing, the output shaft and housing are free to rotate relative to the outer housing upon which it is conveyed into the well and relative to the stator of a progressive cavity pump suspended beneath the drive means. The output shaft 12 is connected to the rotor 300R of a progressive cavity pump 300 having a stator 300S. As seen in FIG. 1, the rotor 300R of the progressive cavity pump 300 is offset from the central axis of the stator 300S. As the input shaft 10 rotates and causes output shaft 12 to rotate, the output shaft 12 and progressive cavity pump rotor 300R not only rotate about their central axis 12A (FIG. 1), but also move around a circular path relative to the stator 300S of the progressive cavity pump 300 (whose axis coincides with the axis of the input shaft 10). As the input shaft 10 is rotated, and so causes the output shaft 12 and the connected progressive cavity pump rotor 300R to rotate, the output shaft 12 and the connected progressive cavity pump rotor 300R also describe a circular path relative to the axis of the stator 300S of the progressive cavity pump 300, the housing rotating to accommodate this movement.

Thus it will be seen that the progressive cavity pump rotor 300R may be driven in the required manner without the use of a flexible or jointer member.

It will be noted that since the outer rotor of the input shaft 10 is a three-lobed gerotor shape and the inner rotor of the output shaft 12 is a two-lobed gerotor shape, a single revolution of the input shaft causes the output shaft to turn by approximately 1.5 revolutions (it will not be exactly 1.5 because of the circular movement of the output shaft itself). It will be realized that other gear ratios may be chosen, and also that the input shaft could feature a male shape and the output shaft could feature a female shape. Also, the bore of the housing could be shaped so that separate bearing elements are not required.

Alternative embodiments using the principles disclosed will suggest themselves to those skilled in the art upon studying the foregoing description and the drawings. It is intended that such alternatives are included within the scope of the invention, which is limited only by the claims.

What we claim is:

1. In a downhole progressive cavity pump, a drive means comprising an input shaft and an output shaft, the input shaft being coupled to a means of rotation, the output shaft being coupled to a rotor of the progressive cavity pump, the input shaft and the output shaft being non-collinear so that the output shaft rotates about an axis of the output shaft while describing a circular path with respect to the input shaft, wherein the input shaft and output shaft are coupled by a male inner rotor and a female outer rotor, the rotors being coupled by a group of interengaged projections, the said projections consisting of n first projections and n+1 second projections, the male inner rotor comprising the first projections, the female outer rotor comprising the second projections, the second projections of the female outer rotor extending radially inwardly to engage the first projections of the male inner rotor and transmit torque from the input shaft to the output shaft;

and the male and female rotors being operatively positioned within a housing having at least one eccentric bearing for constraining at least one of the input shaft and the output shaft.

2. The drive means according to claim 1, wherein the output shaft is supported on the said eccentric bearing in the said housing.

3. The drive means according to claim 2, wherein the eccentric bearing is crescent shaped.

4. The drive means according to claim 1, wherein the male inner rotor has only two first projections and the female outer rotor has only three second projections.

5. The drive means according to claim 1, wherein the interface of the male inner rotor and the female outer rotor comprise a gerotor shape.

6. The drive means according to claim 5, wherein the female outer rotor is a three-lobed gerotor shape and the male inner rotor is a two-lobed gerotor shape.

7. The drive means according to claim 1, wherein a single revolution of the input shaft causes the output shaft to turn by approximately 1.5 revolutions.

8. A drive means for driving a rotor of a progressive cavity pump, comprising:

an input shaft operative to transfer torque to an output shaft, the input shaft positioned along an axis of rotation that is offset from an axis of rotation of the output shaft;

the input shaft and the output shaft being coupled by a male rotor and a female rotor, the rotors being coupled by a group of interengaged projections, the said projections consisting of a plurality of first projections and a plurality of second projections, the male rotor comprising the first projections, the female rotor comprising the second projections, such that the first projections and the second projections have a generally gerotor shape;

wherein the output shaft is adapted to be coupled to the rotor of the pump so as to describe a circular path together with the rotor of the pump relative to the axis of rotation of the input shaft;

wherein the male and female rotors are operatively positioned within a housing having at least one eccentric bearing for constraining at least one of the input shaft and the output shaft.

9. The drive means according to claim 8, wherein the plurality of second projections extend radially inwardly to engage the plurality of first projections.

10. The drive means according to claim 9, wherein the interface is operatively positioned within a housing having at least one eccentric bearing for constraining at least one of the input shaft and the output shaft.

11. The drive means according to claim 8, wherein the said plurality of first projections consists of n first projections and the said plurality of second projections consists of n+1 second projections.

12. The drive means according to claim 8, wherein the male rotor has only two first projections and the female rotor has only three second projections.

* * * * *